United States Patent
Tyson et al.

(10) Patent No.: US 8,935,189 B2
(45) Date of Patent: Jan. 13, 2015

(54) APPARATUS AND METHOD FOR PERSONALIZED DELIVERY OF CONTENT FROM MULTIPLE DATA SOURCES

(75) Inventors: Mabry W. Tyson, Los Altos, CA (US); Douglas E. Appelt, Palo Alto, CA (US); Min Yin, San Jose, CA (US); William Jarrold, Davis, CA (US)

(73) Assignee: SRI International, Menlo Park, CA (US)

( * ) Notice: Subject to any disclaimer, the term of this patent is extended or adjusted under 35 U.S.C. 154(b) by 276 days.

(21) Appl. No.: 13/118,226

(22) Filed: May 27, 2011

(65) Prior Publication Data

US 2011/0295780 A1    Dec. 1, 2011

Related U.S. Application Data

(60) Provisional application No. 61/349,769, filed on May 28, 2010.

(51) Int. Cl.
| | |
|---|---|
| G06N 5/00 | (2006.01) |
| G06F 1/00 | (2006.01) |
| G06Q 30/02 | (2012.01) |
| G06F 17/30 | (2006.01) |
| G06Q 10/10 | (2012.01) |

(52) U.S. Cl.
CPC .......... *G06Q 30/02* (2013.01); *G06F 17/30997* (2013.01); *G06Q 10/10* (2013.01)
USPC ................ 706/12; 715/753; 725/40; 709/219

(58) Field of Classification Search
USPC .......................................................... 706/12
See application file for complete search history.

(56) References Cited

U.S. PATENT DOCUMENTS

| | | | |
|---|---|---|---|
| 6,990,633 B1* | 1/2006 | Miyasaka et al. | 715/201 |
| 2010/0287588 A1* | 11/2010 | Cox et al. | 725/40 |
| 2011/0217685 A1* | 9/2011 | Srinivasan et al. | 434/323 |

\* cited by examiner

*Primary Examiner* — Jeffrey A Gaffin
*Assistant Examiner* — Kalpana Bhardawaj
(74) *Attorney, Agent, or Firm* — Cooley LLP

(57) ABSTRACT

A non-transitory computer readable storage medium includes instructions to collect explicit feedback from a user regarding user content preferences. Multiple data sources are monitored. Topics associated with the multiple data sources are classified. The importance of the topics to the user is characterized. Content is delivered to the user when a selected topic exceeds an importance threshold for the user. Implicit feedback from the user that characterizes refined user content preferences is tracked. The instructions to characterize the importance of topics evaluates the explicit feedback and the implicit feedback.

8 Claims, 2 Drawing Sheets

APPARATUS AND METHOD FOR PERSONALIZED DELIVERY OF CONTENT FROM MULTIPLE DATA SOURCES

CROSS-REFERENCE TO RELATED APPLICATION

This application claims priority to U.S. Provisional Patent Application 61/349,679, filed May 28, 2010, the contents of which are incorporated herein.

STATEMENT REGARDING FEDERALLY SPONSORED RESEARCH OR DEVELOPMENT

This invention was made with government support under contract number NBCHD030010 awarded by the United States Government Department of the Interior and with the U.S. Air Force Research Laboratory under Government contract number FA8750-09-D-0183. The Government has certain rights in this invention.

FIELD OF THE INVENTION

This invention relates generally to information distribution in computer networks. More particularly, this invention relates to techniques for personalized delivery of content from multiple data sources.

BACKGROUND OF THE INVENTION

It is a challenge to identify relevant information in a large set of documents, especially where the contents of the documents are not known in advance. Examples of such sets of documents include RSS or news feeds, incoming mail, discussion boards or blogs, or streams of chat, twitter tweets, or transcripts of audio.

There are existing techniques to sort information in large data feeds. These techniques use statistical methodologies to determine the information that is most popular with large numbers of users.

It would be desirable to develop a new sorting paradigm that focuses on personal relevance of information instead of the relevance of information to a large number of users.

SUMMARY OF THE INVENTION

A non-transitory computer readable storage medium includes instructions to collect explicit feedback from a user regarding user content preferences. Multiple data sources are monitored. Topics associated with the multiple data sources are classified. The importance of the topics to the user is characterized. Content is delivered to the user when a selected topic exceeds an importance threshold for the user. Implicit feedback from the user that characterizes refined user content preferences is tracked. The instructions to characterize the importance of topics evaluates the explicit feedback and the implicit feedback.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
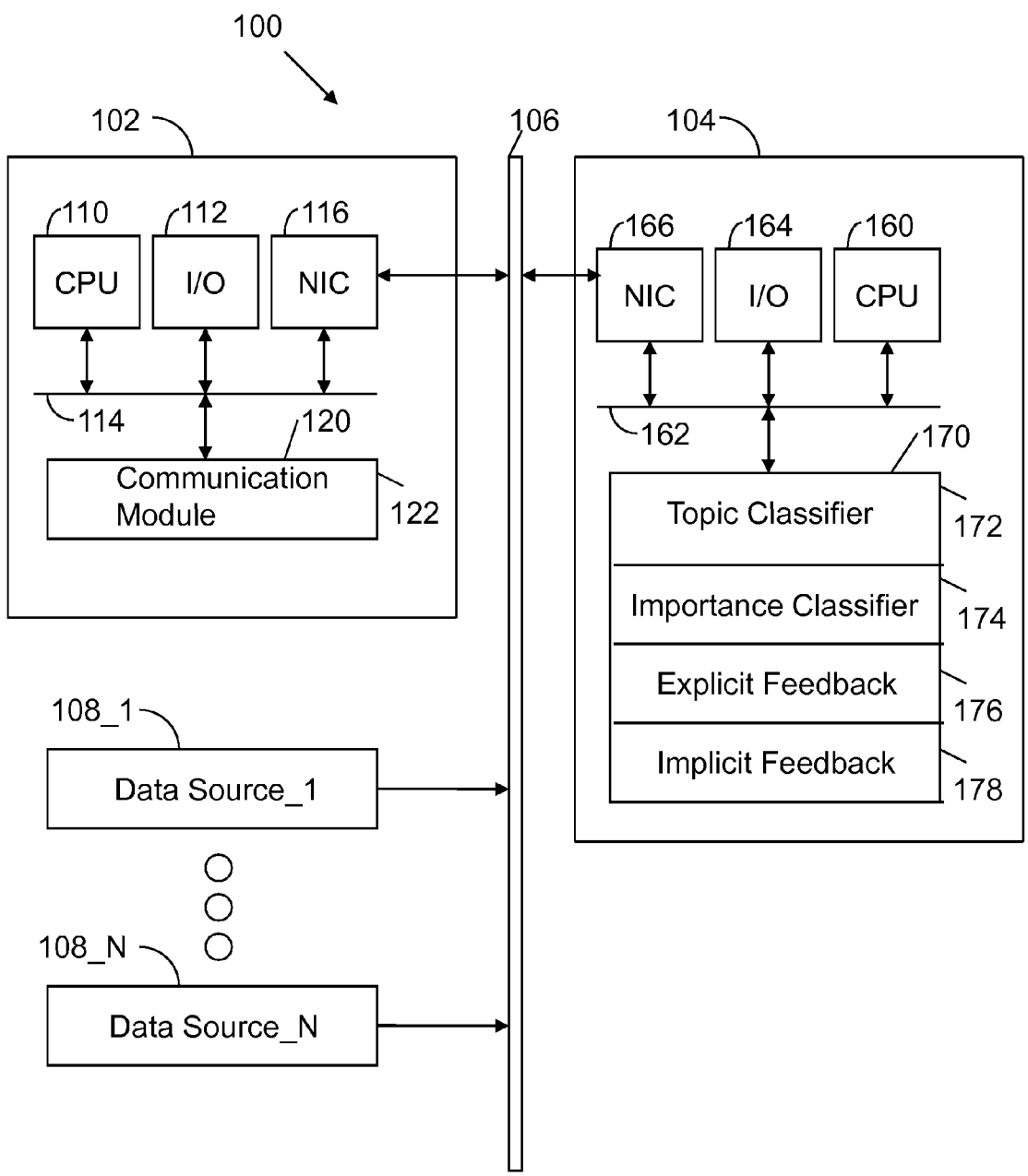
FIG. 1 illustrates a system configured in accordance with an embodiment of the invention.

This invention monitors information sources and identifies documents that are specifically relevant to the individual user's interests. The system processes documents collected from diverse sources which are either unclassified or classified only on very broad topics rather than to specific customized user needs (e.g., RSS feeds, blog firehoses, search engine dynamic feeds, etc). The user would normally have to peruse all the articles or use traditional search to find the most relevant information. If the feed is sparse in relevant information, the user may waste a lot of time or may stop following the feed. This invention can improve the user's efficiency by authoring a digested feed of content containing only the most relevant information.

A model of the user's interests is built by observing the articles that are read. By reading an article, the user provides implicit feedback of the article's relevance. Alternatively or in addition, the user can provide explicit feedback. A user can also identify articles as belonging to one of an optional set of user-defined topics. The feedback also allows the system to build a model of the topics. The use of implicit feedback minimizes the user's cognitive load while gaining the benefit of the learning technology.

Using the models and a classifier, the topic and relevance of new articles are predicted. The user only needs to identify a topic of interest, which can be done by typing in key words or adding the web link/url of a story of interest. For example, if the user is interested in the 2012 Presidential Campaign and Election, the user can type in a series of descriptors, including 2012 presidential election, Obama, GOP, New Hampshire primary, and so on. Based on this input, the technology will continuously scan streams of new content, identifying those stories that are relevant and deliver the content to the user. The user will then "score" these stories either through implicit actions (e.g., reading, savings, sharing, or deleting) or explicitly (e.g., by offering a "thumbs up" or "thumbs down," depending on the perceived value of this content to the individual user).

The system learns based on this feedback, giving the user more of what is liked, and less of what is disliked. In this simple example, one user my only want information about a democratic candidate, a second user may only want information about a republican candidate, and a third user may only want information about a green party candidate. The system quickly learns these preferences, adjusts, and continues to refine the selection with each instance of user feedback.

Because this system focuses on the relevant content, the user can read articles only in specific areas of interest, without having to guess specific sources (e.g., websites, RSS feeds, etc.) and without having to sift through streams of irrelevant, uninteresting content.

Once the technology has been delivered to the user, this system provides the user a rich tool set, providing capabilities to allow saving articles to a reading list, annotating the articles, or sharing with associates via email, or by posting on popular social media services (e.g., Twitter, Facebook, etc.) Features of the technology include:

1. The supply of personalized information to a user based on a users personal interest, not by what is deemed popular based on statistical determination of what is "popular."
2. Unlike techniques which require a user to identify specific sources of information (specific RSS feeds, for example), this technology culls information from an extremely broad range of sources, delivering to the users only that which is most important.

3. This technology adapts based on the users implicit and explicit behavior. With each instance of use, the technology becomes "smarter," continuously refining the type of content delivered to the user.
4. The information is persistent. Unlike search, which is a one time event, this technology establishes a permanent topical information "container," to which content of increasing relevance will be perpetually delivered until the user decides to terminate the collection.
5. Finally, once the information has been delivered to the user's topical container, it allows the user to save individual articles to a reading list, or share articles with associates via email, or through popular social media applications (e.g., Twitter, Facebook, etc.).

The invention is more fully appreciated with reference to FIG. 1. FIG. 1 illustrates a system 100 configured in accordance with an embodiment of the invention. The system 100 includes a client device 102 and a server computer 104 linked by a transmission channel 106, which may be any wired or wireless transmission channel. A variety of data sources 108_1 through 108_N are also connected to the transmission channel 106. By way of example, the data sources 108 may include an RSS source, a chat source, shared files, email, and the like.

The client device 102 includes standard components, such as a Central Processing Unit 110 and input/output devices 112 connected via a bus 114. The input/output devices may include a keyboard, mouse, touch display and the like. A network interface card 116 is also connected to the bus 114 to provide a communication link with the transmission channel 106. A memory 120 is also connected to the bus 114. The memory stores a communication module 122, which may be a browser or application to facilitate network communications. The client 102 may be a computer, smart phone, personal digital assistant or similar device.

The server 104 also includes standard components, such as a network interface circuit 166, input/output devices 164 and a central processing unit 160 connected via a bus 162. A memory 170 is also connected to the bus 162. The memory 170 includes executable instructions to implement operations of the invention. In one embodiment, the memory 170 stores a topic classifier 172. The topic classifier 172 classifies topics observed from the data sources 108. A topic classifier utilizes a training set of data containing known observations for a sub-population to identify the sub-population to which new observations belong. New individual items are placed into groups by the classifier based upon quantitative information on one or more measurements, traits or characteristics established by the training set.

The importance classifier 174 includes instructions to characterize the importance of identified topics to a particular user. This classification may be based upon explicit feedback 176 provided by the user and implicit feedback 178 gathered by observing activities of the user.

Figure 2:
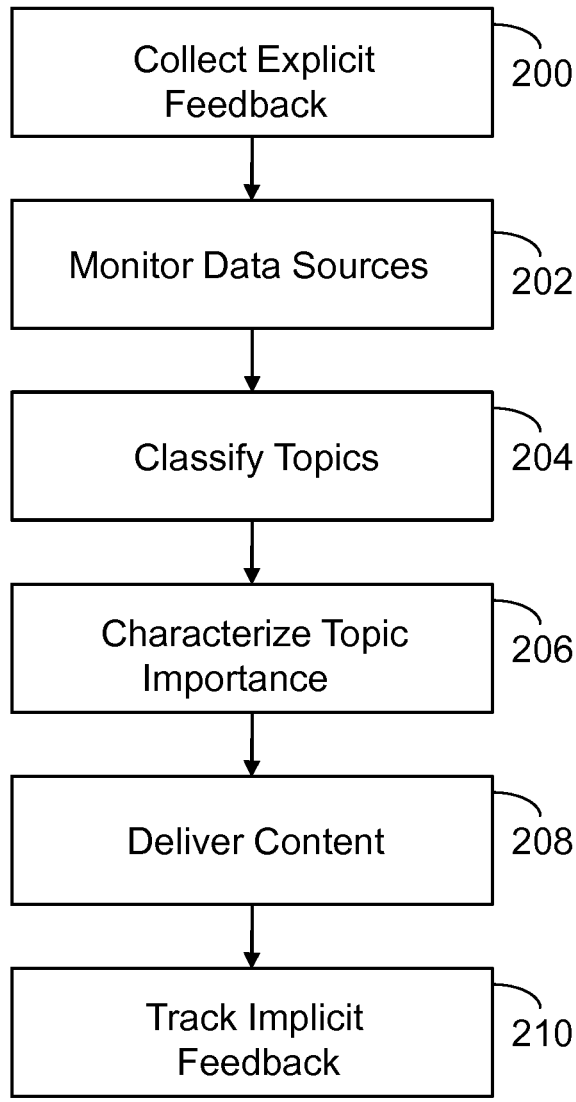
FIG. 2 illustrates processing operations associated with an embodiment of the invention.

FIG. 2 illustrates processing operations associated with an embodiment of the invention. Initially, explicit feedback is collected 200. For example, the explicit feedback may be collected from a web form that solicits a user's interests. Server 104 may deliver the form to client 102 and then collect the responses from the user utilizing the client 102.

Next, data sources are monitored 202. For example, server 104 may monitor data sources 108_1 through 108_N. Topics within the monitored data sources are then classified 204. After classification, the importance of individual topics is characterized 206. If a topic and its importance exceeds a pre-determined threshold for the user, then the content is delivered to the user 208. The user's interaction with the content is then tracked to develop implicit feedback 210. Implicit feedback may also be gathered by observing general operations of the user (e.g., who the user is communicating with, what topics are commonly addressed, etc.).

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising instructions to:
   collect explicit feedback from a user regarding textual content preferences;
   monitor a plurality of diverse data sources generating textual content, wherein the plurality of diverse data sources include websites, RSS feeds, blogs and social media services generating textual content;
   classify topics associated with the plurality of diverse data sources to form a model of topics;
   characterize the importance of the topics to the user to form a model of user interests;
   deliver textual content to the user when, based on the model of topics and the model of user interests, a selected topic exceeds an importance threshold for the user; and
   track implicit feedback from the user that characterizes refined textual content preferences;

wherein the instructions to characterize the importance of topics evaluates the explicit feedback and the implicit feedback.

2. The non-transitory computer readable storage medium of claim 1 wherein the explicit feedback is a web form that solicits the interests of the user.

3. The non-transitory computer readable storage medium of claim 1 wherein the explicit feedback is a thumb up or thumb down indication from the user.

4. The non-transitory computer readable storage medium of claim 1 wherein the implicit feedback is reading the textual content.

5. The non-transitory computer readable storage medium of claim 1 wherein the implicit feedback is saving the textual content.

6. The non-transitory computer readable storage medium of claim 1 wherein the implicit feedback is sharing the textual content.

7. The non-transitory computer readable storage medium of claim 1 wherein the implicit feedback is deleting the textual content.

8. The non-transitory computer readable storage medium of claim 1 further comprising executable instructions to form a container of textual content that continuously receives textual content until the container is terminated.

* * * * *